United States Patent [19]

Uphus

[11] Patent Number: 4,626,349
[45] Date of Patent: Dec. 2, 1986

[54] DEVICE FOR SEPARATING SOLIDS FROM LIQUIDS

[75] Inventor: Arnold Uphus, Oelde, Fed. Rep. of Germany

[73] Assignee: Westfalia Separator AG, Oelde, Fed. Rep. of Germany

[21] Appl. No.: 708,320

[22] Filed: Mar. 5, 1985

[30] Foreign Application Priority Data

Mar. 21, 1984 [DE] Fed. Rep. of Germany ....... 3410307

[51] Int. Cl.$^4$ ........................................... B01D 39/10
[52] U.S. Cl. .................................. 210/250; 210/456; 210/460; 210/499
[58] Field of Search .............. 210/249, 250, 406, 456, 210/499, 403, 460, 461, 462, 463

[56] References Cited

U.S. PATENT DOCUMENTS

| 188,429 | 3/1887 | Smith | 210/403 |
|---|---|---|---|
| 1,225,160 | 5/1917 | Nihart | 210/499 |
| 1,945,492 | 1/1934 | Lamort | 210/403 |
| 2,341,274 | 2/1944 | Hoff | 210/499 |
| 2,488,473 | 11/1949 | Lane | 210/456 |
| 3,206,396 | 9/1965 | Davis | 210/456 |
| 3,451,555 | 6/1969 | Ginaven | 210/499 |
| 3,833,123 | 9/1974 | Walker | 210/499 |
| 3,988,243 | 10/1976 | Huff | 210/456 |
| 4,268,382 | 5/1981 | Hanke | 210/499 |
| 4,377,479 | 3/1983 | Pierson | 210/406 |
| 4,439,320 | 3/1984 | Blok | 210/403 |

FOREIGN PATENT DOCUMENTS

| 2050855 | 1/1981 | United Kingdom | 210/499 |
|---|---|---|---|
| 2061748 | 5/1981 | United Kingdom | 210/456 |

*Primary Examiner*—Ernest G. Therkorn
*Attorney, Agent, or Firm*—Sprung Horn Kramer & Woods

[57] ABSTRACT

A device for separating solids from liquids by means of a screen that inclines at an angle to the horizontal and is accommodated in a prescribed position within a screen housing. There is a product-delivery component with a feed pipe at the higher end of the screen and a receiving chamber with a drain pipe for the separated liquid below the screen. To ensure that the screen is uniformly loaded over its total effective width and that the quality of the separated solids will accordingly remain constant as the product and feed conditions vary, the screen housing is mounted in such a way that it can be pivoted around a horizontal axis in order to vary its angle of inclination to the horizontal.

6 Claims, 1 Drawing Figure

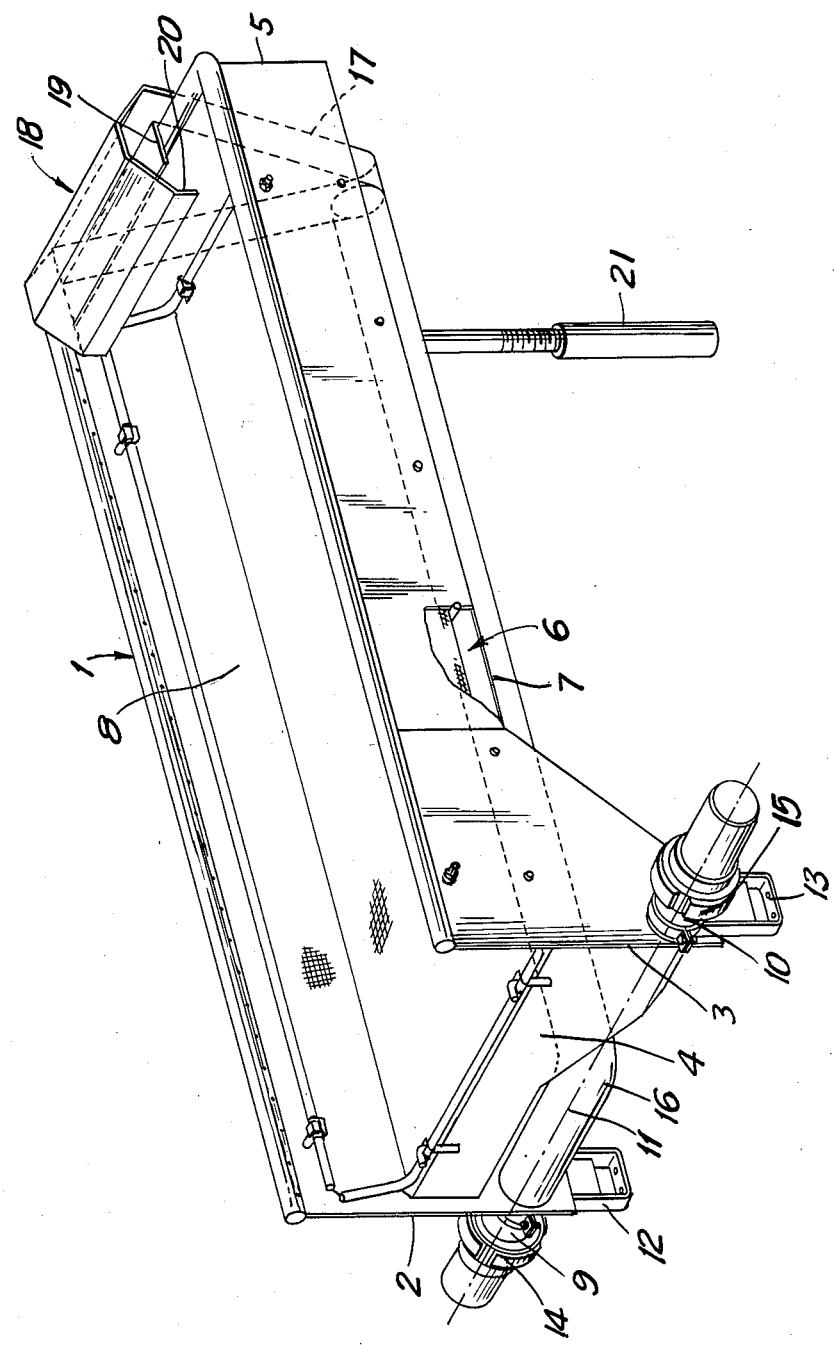

DEVICE FOR SEPARATING SOLIDS FROM LIQUIDS

BACKGROUND OF THE INVENTION

The present invention relates to a device for separating solids from liquids by means of a screen that inclines at an angle to the horizontal and is accommodated in a prescribed position within a screen housing and wherein there is a product-delivery component with a feed pipe at the higher end of the screen and a receiving chamber with a drain pipe for the separated liquid below the screen.

A device of this type is known for example from British Pat. No. 2 050 855. The screen is accommodated in a stationary container at an invariable angle of inclination. The rate at which the product flows over the screen, and hence the residual moisture content of the solids, varies in accordance with the volume of product flowing in, which is undesirable in terms of uniform product quality.

Another drawback of the known device derives from the product being delivered in a direction opposite to that in which it flows through the feed pipe and over the screen, with the outlet from the feed pipe oriented toward a feed plane that slopes down and terminates just upstream of the screen, resulting in a gap that is intended to ensure uniform distribution of the product over the screen. Because it is impossible to obtain uniform liquid distribution over the feed plane, the material backs up to a varying extent upstream of the gap. The backup results in variations in the rate of flow over the total width of the gap and hence in the distribution of the product over the screen. Varying the amount of product supplied will vary its distribution over the screen and hence the residual moisture content of the solids.

SUMMARY OF THE INVENTION

The object of the present invention is to improve the known device in such a way that the quality of the separated solids will remain constant as the product and feed conditions vary.

This object is attained in accordance with the invention in that the screen housing is mounted in such a way that it can be pivoted around a horizontal axis in order to vary its angle of inclination to the horizontal. The rate at which the product flows over the screen can accordingly be varied in accordance with varying feed conditions in such a way as to obtain a desired residual moisture content in the solids.

In one preferred embodiment of the invention, the connection 9 to the feed pipe 16 and the connection 10 to the drain pipe are positioned on the screen housing in such a way that their axes of symmetry coincide with the horizontal axis that the housing pivots on. The screen housing can accordingly be pivoted without disassembling the feed pipe and drain pipe.

It is especially practical when the connections to the feed and drain pipes are positioned on opposite sides of the housing and mounted in such a way that they can rotate in step bearings. This facilitates pivoting the housing.

At least one foot that can be varied in height can be positioned at the end of the housing that is remote from its axis of pivot. The foot is employed to vary the angle of inclination of the screen.

An especially uniform distribution of product over the screen can be attained when the amounts being fed in, vary if there is a weir in the product-delivery component over which the product is fed to the screen. Constant product distribution likewise promotes a constant residual moisture content in the solids.

The product will flow especially uniformly over the weir if the rate of flow in the feed pipe can be decreased by means of a vertical funnel that has an outwardly tapering cross-section and is positioned upstream of the weir.

Optimal results are obtained when the funnel tapers up to the total width of the weir.

A baffle can be associated with the weir. The baffles will ensure that the product is delivered at the same location on the screen even when the angle of inclination is varied.

A preferred embodiment of the invention will now be described with reference to the attached drawing, wherein:

BRIEF DESCRIPTION OF THE DRAWING

The FIGURE is a perspective view of a device for separating solids from liquids in accordance with the invention.

Referring now to the FIGURE, a screen housing 1 consists of side walls 2 and 3, a front wall 4, a rear wall 5, and a floor 7 in the form of a receiving chamber 6. A screen 8 is positioned over receiving chamber 6 in screen housing 1 and extends to above front wall 4. There is a product-feed connection 9 on side wall 2 in the vicinity of front wall 4 and, opposite it, on side wall 3 a connection 10 through which the liquid flows out of receiving chamber 6. The axes of symmetry of connections 9 and 10 coincide with a horizontal axis 11, around which screen housing 1 can be pivoted. Connections 9 and 10 are mounted in such a way that they can rotate in step bearings 12 and 13 and have connectors 14 and 15 at their free ends. A feed pipe 16 extends from connection 9 to rear wall 5, on which there is an outwardly tapering vertical funnel 17. Feed pipe 16 empties into the bottom of funnel 17. There is a product-delivery component 18 at the top of funnel 17 that consists of a weir 19, which extends toward screen 8, and of a baffle 20 facing the weir. A longitudinally variable foot 21 is positioned under floor 7 in the vicinity of the rear wall 5 of screen housing 1.

The product is supplied through connection 9 and arrives through feed pipe 16 in the bottom of funnel 17. Since the tapering cross-section of funnel 17 severely decelerates the flow of the product toward product-delivery component 18, the product will flow laminarly over the total width of product-delivery component 18, ensuring a very uniform load on screen 8 at all possible feed conditions.

The rate at which the product flows over screen 8 depends on the angle of inclination of the screen to the hgrizontal. Since screen housing 1 can be pivoted with screen 8 secured inside it around the axis of symmetry 11 of connections 9 and 10, the inclination of the screen can be adjusted to any angle desired. The screen can even be adjusted during operation because the feed and outflow lines, which communicate with connections 9 and 10 through connectors 14 and 15, do not need to be disconnected. The particular angle of inclination of screen 8 can be fixed by means of adjustable foot 21.

In use, separated solids slide over screen 8, leave it above front wall 4, and drop into a container, not illustrated, below housing 1. The liquid passes through screen 8, arrives in receiving chamber 6, and is removed through connection 10.

What is claimed is:

1. In a device for separating solids from liquids including a feed pipe, an outlet, a screen mounted in a housing, a receiving chamber below the screen and in communication with the outlet, and product-delivery means receptive of product from the feed pipe for feeding same on to the screen at one side, the improvement comprising: means mounting the screen housing and product delivery means for pivotal movement around a horizontal axis at the opposite side of the screen parallel to said one side of the screen to vary the angle of inclination of the screen with respect to the horizontal, comprising a first rotatable connection to the feed pipe and a second rotatable connection to the outlet positioned on opposite sides of the screen housing with their axes of rotation coinciding with the horizontal pivot axis of the screen housing, whereby a change in the angle of inclination of the screen can be obtained without affecting the relative position of the product delivery means and the screen.

2. The device as in claim 1, wherein the first and second connections comprise step bearings which are rotatable about said horizontal pivot axis.

3. The device as in claim 1, further comprising at least one foot having means for varying the height of the screen housing and positioned at said one side and remote from the pivot axis.

4. The device as in claim 1, wherein the product delivery means comprises a weir over which product is fed to the screen and a vertical funnel having an outwardly tapering cross-section and positioned upstream of the weir, and wherein the feed pipe empties into the narrower end of the funnel.

5. The device as in claim 4, wherein the funnel tapers up to the total width of the weir.

6. The device as in claim 4, wherein the product delivery means further comprises a baffle associated with the weir.

* * * * *